Patented Mar. 1, 1949

2,462,939

UNITED STATES PATENT OFFICE 2,462,939

PROCESS FOR THE SEPARATION OF ISOMERIC SUBSTITUTED QUINOLINE CARBOXYLIC ACIDS AND ESTERS THEREOF

Maurice Ernest Bouvier, St. Didier au Mont d'Or, and Michel Marius Mosnier, Lyon, France, assignors to Societe des Usines Chimiques Rhone-Poulenc, Paris, France, a French body corporate No Drawing. Application May 21, 1946, Serial No. 671,404. In France May 17, 1945

Section 1, Public Law 690, August 8, 1946
Patent expires May 17, 1965

6 Claims. (Cl. 260—287)

1

This invention relates to processes for the separation of isomeric substituted quinoline carboxylic acids and of their esters; more specifically it concerns the 5-chloro- and 7-chloro-4-hydroxy-3-methylquinoline-2-carboxylic acids and esters of such acids.

When meta-chloraniline is condensed in the cold with the diethyl ester of oxalo-propionic acid, there is obtained the diethyl ester of m-chloro-phenyliminomethyl succinic acid, represented by Formula I. When heated, this substance ring-closes, to give mainly two isomeric quinoline derivatives, 7 - chloro - 4 - hydroxy-3-methylquinoline-2-carboxylic acid ethyl ester, represented

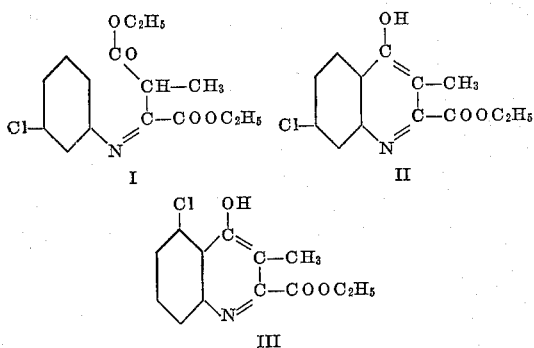

by Formula II, and 5-chloro-4-hydroxy-3-methylquinoline-2-carboxylic acid ethyl ester, represented by Formula III.

From this mixture, saponification, decarboxylation and chlorination yield a mixture of 3-methyl-4:7-dichloroquinoline and 3-methyl-4:5-dichloroquinoline, and it has been proposed that this mixture should be used, instead of pure 3-methyl-4:7-dichloro-quinoline, in the preparation of chemotherapeutic agents.

When this mixture is substituted for the single substance, the therapeutic activity is impaired; but in practice the isolation of the 7-chloro-compound involves very considerable difficulty: hence the proposal to use the mixed isomers.

At the stage of the production of the two esters hereinbefore described, it is possible to effect a separation by taking advantage of the difference in their solubilities in organic solvents and in particular in chloroform and alcohol; but this method is far from quantitative and necessitates the use of volatile products—always an unsatisfactory procedure.

Now it has been found that at easily regulated temperatures, the acid corresponding to the ester

2 of Formula II and its esters are insoluble in certain strong acids, whilst the 5-isomers are soluble.

According to the present invention, therefore, a process for the separation of the components of a member of the class consisting of a mixture of the isomeric 7- and 5-chloro-4-hydroxy-3-methyl quinoline-2-carboxylic acids and a mixture of esters of these two acids comprises treating the mixture with a strong acid at a temperature and acid concentration at which the 5-chloro isomer dissolves or remains in solution and at which the 7-chloro isomer is insoluble or precipitates.

The term "strong acid" as used in this specification and in the appended claims means only those strong inorganic or organic acids which do not possess a chemical reactivity, as distinct from the property of salt formation, such as to bring about a modification of structure of the carboxylic acids in question. Thus, for example, while sulphuric and hydrochloric acids are eminently suitable for use in the process of the present invention, nitric acid cannot be employed on account of its chemical reactivity. A typical organic acid for the present purpose is formic acid.

It should be understood that the concentration of acid selected and the temperature at which separation of the isomers is effected is dependent upon the particular acid chosen. Optimum conditions for any particular case can be determined by simple preliminary trial on the basis of the data hereinafter given. In the case of sulphuric acid, the difference in solubility of the two isomeric acids is least in very concentrated acid. In sulphuric acid which is too dilute, the solubility of both isomers becomes zero. The optimum concentration lies between or in the neighbourhood of 50–70%. Thus, sulphuric acid at a concentration between 55 and 65% dissolves 5-chloro-4-hydroxy-3-methyl-quinoline - 2 - carboxylic acid in the cold while the 7-chloro isomer is soluble only on heating. A mixture of the two isomers can be dissolved hot and then cooled, whereupon all of the 7-chloro-isomer crystallises, probably in the form of its sulphate. It is filtered and washed with sulphuric acid of the same concentration. When taken up in water, the free acid is obtained practically pure. The 5-chloro isomer may be obtained quantitatively from the sulphuric acid solution by dilution with water. Hot concentrated hydrochloric acid dissolves the 5-isomer but not the 7-isomer. Hot concentrated formic acid dissolves both isomers. On cooling, the 7-isomer precipitates.

Where the isomeric esters are to be separated, they may be treated with hot hydrochloric acid; this dissolves only the 5-isomer, which is recovered by cooling the hydrochloric acid solution, without saponification having occurred.

It is also possible to effect intentional saponification of the esters, and separate the isomeric acids thus obtained without their intermediate isolation as a mixture, by allowing the esters to react with hot sulphuric acid for a time sufficient to ensure complete saponification, and then cooling which effects the separation of the 7-chloro isomeric acid.

*Example 1*

180 parts of the crude mixture of isomeric acids obtained by the alkaline saponification of the esters formed by the cyclisation of the condensation product, derived in the cold from m-chloraniline and oxalopropionic acid ethyl ester, are dissolved, with shaking and heating to 90–115° C. in 2,200 parts by weight of sulphuric acid, s. g. 1.470. Dissolution goes to completion. When the temperature falls to 90° C., crystals begin to deposit, the crop being very abundant from 90° to 80° C. When the temperature has fallen to 20° C., the crystals are filtered off, washed in sulphuric acid of s. g. 1.470 until a drop of the filterate no longer gives a precipitate with water. The crystals collected from the filter are boiled up with water, cooled and filtered, the product being then washed with water and dried in the oven. By this means 81 parts of an acid M. P. 310–312° C. are obtained, this being the 7-chloro isomer. The acid mother liquor and washings are diluted with their own volume of water, which precipitates a white product which is filtered and washed until free from sulphuric acid. This is dried in the oven, giving 88 parts of a product M. P. 275° C., the isomeric 5-chloro acid. Starting from the crude saponification product, complete separation of the isomers in the pure state results.

Instead of sulphuric acid of density 1.470, it is equally advantageous to use that with density 1.530. In the latter case 180 parts of the mixed acids may be dissolved in 1,530 instead of 2,200 parts by weight of sulphuric acid.

*Example 2*

In order to show that separation by means of sulphuric acid not only yields pure products, but is also quantitative, the following experiment was carried out with a mixture of the pure isomeric acids.

To 110 parts by weight of sulphuric acid, density 1.470, is added a mixture of 4.5 parts by weight of pure 5-chloro-4-hydroxy-3-methylquinoline-2-carboxylic acid (M. P. 275° C.) and 4.5 parts by weight of pure 7-chloro-4-hydroxy-3-methylquinoline-2-carboxylic acid (M. P. 310–312° C.). The former dissolves immediately at room temperature; in order to dissolve the latter, the mixture is heated to about 110° C., at which temperature solution is complete. On cooling, crystallisation commences at about 90° C. giving small, shining needles. When the temperature has fallen to 20° C., the crystals are filtered and washed with sulphuric acid of the same strength as that used at the outset, and worked up as in Example I.

The yield was 4.5 parts of the 7-chloro acid, melting at 310–312° C. and, in addition, 4.5 parts of the 5-chloro acid, melting at 275° C. Thus the separation is quantitative.

*Example 3*

40 g. of the mixed esters obtained by cyclisation of the condensation product of m-chloraniline and oxalopropionic acid ethyl ester are heated with stirring to 80° C. with 200 cc. of hydrochloric acid, s. g. 1.160–1.170. After heating for 10 minutes, the product is filtered hot, the insoluble 7-chloro isomer remaining on the filter. The latter is washed with warm hydrochloric acid and then with water. By this means there is obtained 7-chloro-4-hydroxy-3-methylquinoline-2-carboxylic acid ester which, after a single recrystallisation from chloroform, has the melting point of the pure ester (230–231° C.).

Cooling of the hydrochloric acid solution, filtration and washing gives the 5-chloro ester. Recrystallisation from alcohol brings the melting point of this product to 220–221° C., the melting point of the pure product.

*Example 4*

To 2,200 parts by weight of sulphuric acid, s. g. 1.470, are added 200 parts by weight of the mixed esters, obtained by cyclisation of the condensation product of m-chloraniline and oxalopropionic acid ethyl ester. The mixture is heated and at about 100° C. solution is complete. The temperature is raised to 115° C. and kept at that level until a sample shows that the product is completely soluble in sodium bicarbonate solution, the process requiring 2 to 4 hours. At this stage the esters have been saponified. Operation continues as in Example I. The yield is about 84 parts of the 7-chloro acid (M. P. 312° C.) and about 86 parts of the isomeric 5-chloro acid (M. P. 275° C.).

We claim:

1. Process for the separation of the components of a member of the class consisting of a mixture of the isomeric 7- and 5-chloro-4-hydroxy-3-methyl quinoline-2-carboxylic acids and a mixture of esters of these two acids which comprises treating the mixture with an acid selected from the class consisting of formic acid, hydrochloric acid and sulfuric acid to dissolve the 5-chloro isomer only.

2. Process as claimed in claim 1, wherein a mixture of the isomeric acids is treated with sulphuric acid of a concentration between 50 and 70%.

3. Process for the separation of the components of a member of the class consisting of a mixture of the isomeric 7- and 5-chloro-4-hydroxy-3-methyl quinoline-2-carboxylic acids and a mixture of esters of these two acids which comprises heating the mixture with concentrated sulphuric acid to a temperature at which both isomers are soluble, thereafter cooling the solution and separating the 7-isomer thereby precipitated.

4. Process for the separation of a mixture of the isomeric 7- and 5-chloro-4-hydroxy-3-methyl quinoline-2-carboxylic acids which comprises heating the mixture with sulphuric acid having a concentration of not less than 50% and not greater than 70% to a temperature at which both isomeric acids are soluble, thereafter cooling the solution and separating the 7-chloro isomer thereby precipitated.

5. Process for the separation of a mixture of esters of the isomeric and 7- and 5-chloro-4-hydroxy-3-methyl quinoline-2-carboxylic acids which comprises heating the mixture with hydrochloric acid to dissolve the 5-isomer, and separating therefrom the insoluble 7-isomer.

6. Process for the separation of a mixture of esters of the isomeric 7- and 5-chloro-4-hydroxy-3-methyl quinoline-2-carboxylic acids which comprises heating the mixture with concentrated sulphuric acid until saponification is complete, thereafter cooling the solution and separating the 7-chloro acid thereby precipitated.

MAURICE ERNEST BOUVIER.
MICHEL MARIUS MOSNIER.

REFERENCES CITED

The following references are of record in the file of this patent:

FOREIGN PATENTS

| Number | Country | Date |
|---|---|---|
| 915,399 | France | July 22, 1946 |